US012650536B2

(12) United States Patent
Zhang

(10) Patent No.: US 12,650,536 B2
(45) Date of Patent: *Jun. 9, 2026

(54) INTEGRATION AND CALIBRATION METHOD OF GEOMAGNETIC VECTOR MEASURING DEVICE FOR EXPLORATION

(71) Applicant: Zhongkan Geophysical Co. Ltd., Baoding City (CN)

(72) Inventor: Qingshan Zhang, Baoding City (CN)

(73) Assignee: Zhongkan Geophysical Co. Ltd., Baoding City (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/243,675

(22) Filed: Jun. 19, 2025

(65) Prior Publication Data

US 2025/0314801 A1 Oct. 9, 2025

Related U.S. Application Data

(63) Continuation of application No. 18/963,573, filed on Nov. 28, 2024, now Pat. No. 12,416,743.

(30) Foreign Application Priority Data

Jul. 30, 2024 (CN) .......................... 202411030251.4

(51) Int. Cl.
*G01V 7/02* (2006.01)
(52) U.S. Cl.
CPC ...................................... *G01V 7/02* (2013.01)
(58) Field of Classification Search
CPC ........................................................ G01V 7/02
See application file for complete search history.

(56) References Cited

U.S. PATENT DOCUMENTS

2016/0154135 A1* 6/2016 Gao ......................... G01V 3/40
324/345

FOREIGN PATENT DOCUMENTS

CN 216870825 U * 7/2022

OTHER PUBLICATIONS

Machine translation of CN216870825U (Year: 2022).*

(Continued)

*Primary Examiner* — Lee E Rodak
*Assistant Examiner* — Sangkyung Lee
(74) *Attorney, Agent, or Firm* — JEEN IP LAW, LLC

(57) ABSTRACT

An integration and calibration method of geomagnetic vector measuring device for exploration is provided and includes: S1, designing a magnetic vector measuring equipment main body as a cross-shaped frame structure; S2, arranging magnetic probes at upper and lower ends of a cross-shaped frame; S3, detecting a rotation relationship between three magnetic axis coordinates of each of the magnetic probes and three-axis coordinates of an attitude instrument; S4, correcting and calculating detected parameters. The disclosure solves the problem in prior art, magnetometers and attitude meters are rigidly installed on an airplane through devices such as hard brackets, and the measurement accuracy is not high because there is no perfect calibration scheme without matching. The disclosure greatly improves the accuracy of geomagnetic vector measurement, and can carry out aerial magnetic vector and vertical gradient measurement of magnetic vectors, and be used for ground geomagnetic vector measurement, and has higher practicability.

1 Claim, 5 Drawing Sheets

(56)            References Cited

OTHER PUBLICATIONS

CNIPA First Office Action, Application No. 202411030251.4 dated Feb. 27, 2024, Chinese Original, pp. 1-4.
CNIPA First Office Action, Application No. 202411030251.4 dated Feb. 27, 2024, English translation, pp. 1-5.

\* cited by examiner

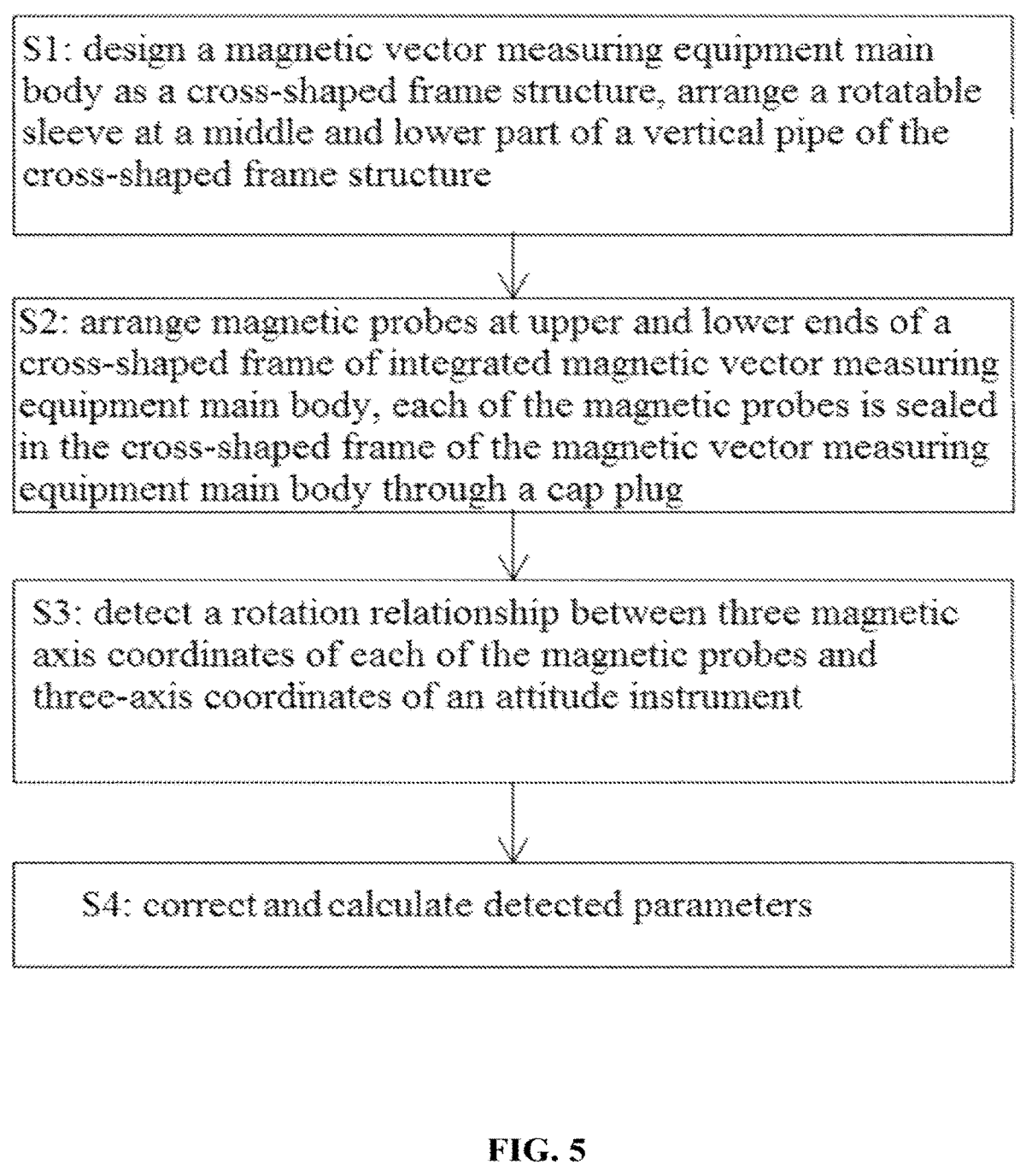

S1: design a magnetic vector measuring equipment main body as a cross-shaped frame structure, arrange a rotatable sleeve at a middle and lower part of a vertical pipe of the cross-shaped frame structure S2: arrange magnetic probes at upper and lower ends of a cross-shaped frame of integrated magnetic vector measuring equipment main body, each of the magnetic probes is sealed in the cross-shaped frame of the magnetic vector measuring equipment main body through a cap plug S3: detect a rotation relationship between three magnetic axis coordinates of each of the magnetic probes and three-axis coordinates of an attitude instrument S4: correct and calculate detected parameters

FIG. 5

INTEGRATION AND CALIBRATION METHOD OF GEOMAGNETIC VECTOR MEASURING DEVICE FOR EXPLORATION

CROSS-REFERENCE TO RELATED APPLICATIONS

This application claims priority of Chinese Patent Application No. 202411030251.4, filed on Jul. 30, 2024, the content of which is hereby incorporated by reference.

TECHNICAL FIELD

The disclosure relates to the technical field of geomagnetic vector measurement and positioning, in particular to an integration and calibration method of geomagnetic vector measuring device for exploration.

BACKGROUND OF THE INVENTION

Geophysical exploration technology involves gravity, magnetism, electricity, vibration and other fields. Among them, magnetic exploration has a long history, is simple and easy to operate, and can realize data acquisition of various scenes such as air, sky, ground, well and underwater, and can adopt various measurement modes such as total field measurement, total field gradient measurement, three-component measurement, three-component gradient measurement and directional measurement (vertical component). In recent years, with the continuous progress of exploration technology, airborne magnetic vector measurement has attracted more and more attention from the industry, and the research on various technical links of magnetic vector measurement has become more and more in-depth. Three-axis fluxgate magnetometer has also been rapidly popularized and applied, among which the use of three-axis fluxgate magnetometer to carry out airborne magnetic vector (gradient) measurement is one of the important topics.

In geophysical exploration, magnetic exploration with magnetometer is the most economical and fast method, and accurate observation of magnetic vector parameters in the field is the goal of research and improvement for many years, so fluxgate magnetometer has been widely used and rapidly improved. Magnetic vector parameters include the intensity (amplitude) and orientation of the total magnetic field. At present, three-axis fluxgate magnetometers are often used for field observation, that is, three orthogonal azimuth components of the total magnetic field value are performed field observation by using a magnetometer with three orthogonal magnetic axis, and then the intensity and orientation of the total magnetic field are calculated synthetically. The magnitude of the magnetic total field vector synthesized by this method is not discussed here, and the precise determination of its vector orientation needs the help of the attitude instrument and other equipment. Therefore, how to integrate and install the magnetometer, attitude instrument and other related equipment to make the attitude determination and magnetic vector determination perfectly combined is also an important problem for magnetic surveyors.

In the past, most of the airborne magnetic vector measurement work use manned helicopters or fixed-wing aircraft, and the magnetometer and attitude instrument are rigidly installed on the aircraft through hard brackets and other devices. Because there is no perfect calibration scheme, the measurement accuracy is not satisfactory. Therefore, it can not meet the existing demand, so we propose an integration and calibration method of geomagnetic vector measuring device for exploration.

SUMMARY OF THE INVENTION

The purpose of the disclosure is to provide an integration and calibration method of geomagnetic vector measuring device for exploration, which can greatly improve the accuracy of geomagnetic vector measurement and the exploration effect, and can not only carry out measurement of aerial magnetic vector and magnetic vector vertical gradient, but also be used for ground geomagnetic vector measurement, with higher practicability, and solve the problems raised in the above background technology.

In order to achieve the above objectives, the disclosure provides the following technical scheme: an integration and calibration method of geomagnetic vector measuring devices for exploration, which includes the following steps:

S1, designing a magnetic vector measuring equipment main body as a cross-shaped frame structure, where a rotatable sleeve is arranged at a middle and lower part of a vertical pipe of the cross-shaped frame structure;

S2, arranging magnetic probes at upper and lower ends of a cross-shaped frame of integrated magnetic vector measuring equipment main body, where each of the magnetic probes is sealed in the cross-shaped frame of the magnetic vector measuring equipment main body through a cap plug;

S3, detecting a rotation relationship between three magnetic axis coordinates of each of the magnetic probes and three-axis coordinates of an attitude instrument, where the three magnetic axis coordinates are marked as $(X_M, Y_M, Z_M)$, and the three-axis coordinates of the attitude instrument are marked as $(Xz, Yz, Zz)$, and three axis of the attitude instrument are respectively a roll axis, a yaw axis and an azimuth axis;

S4, correcting and calculating detected parameters, solving a polar angle and an azimuth angle of T in a spherical coordinate system of a D-shaped vertical pipe, then solving a polar angle and an azimuth angle of T in an attitude instrument coordinate system, and finally solving a polar angle and an azimuth angle of T in a geographical coordinate system.

A method for manufacturing the magnetic vector measuring equipment main body specifically includes:

taking the D-shaped vertical pipe as a foundation and a D-plane of the D-shaped vertical pipe as a benchmark, building the cross-shaped frame in a middle part of the D-shaped vertical pipe by using two framing horizontal pipes;

digging a hole in the middle part of the D-shaped vertical pipe, respectively sleeving two outer thin horizontal pipes on outer sides of two framing horizontal pipes in the middle part of the D-shaped vertical pipe, and respectively fixing GPS antennas at upper ends of outer sides of the two thin horizontal pipes;

fixedly installing an electromagnetic shielding cabinet at a position of the D-shaped vertical pipe meeting the framing horizontal pipes in a middle part of the cross-shaped frame, where a magnetometer host, a recording system, an attitude instrument host and a power supply are installed in the electromagnetic shielding cabinet.

Preferably, detecting a rotation relationship between the three magnetic axis coordinates of each of the magnetic probes and coordinates of the roll axis, the yaw axis and the azimuth axis of the attitude instrument in step S3 specifically includes:

building the spherical coordinate system of the D-shaped vertical pipe, where the spherical coordinate system of the D-shaped vertical pipe is marked as $(\gamma, \theta, \varphi: Z_C, X_C)$, a central axis of the D-shaped vertical pipe is taken as a $Z_C$ axis, a center of the cross-shaped frame of the magnetic vector measuring equipment main body is taken as an original point, and a connecting line of two GPS antennas of the attitude instrument is taken as an $X_C$ axis;

respectively detecting rotation relationships between the three-axis coordinate system of each of the magnetic probes and the spherical coordinate system of the D-shaped vertical pipe, and the three-axis coordinate system of the attitude instrument and the spherical coordinate system of the D-shaped vertical pipe;

collating two sets of data obtained from two detection, selecting 10 columns of data with a best quality as detecting basic data, and analyzing and obtaining data values of various feature points respectively;

calculating azimuth angles and polar angles of $X_M$ axis and $Y_M$ axis in the spherical coordinate system of the D-shaped vertical pipe, where a polar angle of $X_M$ axis in the spherical coordinate system of the D-shaped vertical pipe is marked as $\theta_{Xm}$, a polar angle of $Y_M$ axis in the spherical coordinate system of the D-shaped vertical pipe is marked as $\theta_{Ym}$, an azimuth angle of $X_M$ axis in the spherical coordinate system of the D-shaped vertical pipe is marked as $\varphi_{Xm}$, and an azimuth angle of $Y_M$ axis in the spherical coordinate system of the D-shaped vertical pipe is marked as $\varphi_{Ym}$;

calculating azimuth angles and polar angles of $X_Z$ axis and $Y_Z$ axis in the spherical coordinate system of the D-shaped vertical pipe, where an azimuth angle of $X_Z$ axis in the spherical coordinate system of the D-shaped vertical pipe is marked as $\varphi_{Xz}$, an azimuth angle of $Y_Z$ axis in the spherical coordinate system of the D-shaped vertical pipe is marked as $\varphi_{Yz}$, a polar angle of $X_Z$ axis in the spherical coordinate system of the D-shaped vertical pipe is marked as $\theta_{Xz}$, and a polar angle of $Y_Z$ axis in the spherical coordinate system of the D-shaped vertical pipe is marked as $\theta_{Yz}$;

according to magnetic measuring data of second measurement, enabling an azimuth angle of $Z_M$ axis as $\varphi_{ZD}$, a polar angle of $Z_M$ axis as $\theta_{ZD}$, enabling the azimuth angle of $X_M$ axis as c, and a magnetic north azimuth angle as $\theta_{T0}$, and then calculating and obtaining an azimuth angle $\varphi_{ZD0}$ of the D-shaped vertical pipe.

Preferably, respectively analyzing and obtaining data values of various feature points specifically includes:

respectively analyzing and obtaining maximum values and minimum values of magnetic field components observed by $X_M$ magnetic axis and $Y_M$ magnetic axis of each of the magnetic probes in first observation data, where the maximum values are marked as $T_{x11}$ and $T_{y11}$, and the minimum values are marked as $T_{x12}$ and $T_{y12}$, and geographical azimuth angles corresponding to the maximum values, the minimum values and zero point values of magnetic field components are marked as $\varphi_{mx11}$, $\varphi_{my11}$, $\varphi_{mx12}$, $\varphi_{my12}$, $\varphi_{mxo11}$, $\varphi_{mxo12}$, $\varphi_{myo11}$ and $\varphi_{myo12}$;

respectively analyzing and obtaining maximum values and minimum values of magnetic field components observed by $X_M$ magnetic axis and $Y_M$ magnetic axis of each of the magnetic probes in second observation data, where the maximum values are marked as $T_{x21}$ and $T_{y21}$, the minimum values are marked as $T_{x22}$ and $T_{y22}$, and geographical azimuth angles corresponding to the maximum values, the minimum values and zero point values of magnetic field components are marked as $\varphi_{mx21}$, $\varphi_{my21}$, $\varphi_{mx22}$, $\varphi_{my22}$, $\varphi_{mxo21}$, $\varphi_{mxo22}$, $\varphi_{myo21}$ and $\varphi_{myo22}$;

respectively analyzing and obtaining maximum values and minimum values of observed inclination angles of yaw axis $X_Z$ and pitch axis $Y_Z$ in first observation attitude instrument data, where the maximum values are marked as $\theta_{zx11}$ and $\theta_{zy11}$, the minimum values are marked as $\theta_{zx12}$ and $\theta_{zy12}$, and geographical azimuth angles corresponding to the maximum values, the minimum values and zero point values of the inclination angles are marked as $\varphi_{zx11}$, $\varphi_{zy11}$, $\varphi_{zx12}$, $\varphi_{zy12}$, $\varphi_{zxo11}$, $\varphi_{zxo12}$, $\varphi_{zyo11}$ and $\varphi_{zyo12}$;

then analyzing and obtaining maximum values and minimum values of inclination angles observed on yaw axis $X_Z$ and pitch axis $Y_Z$ in second observation attitude instrument data, where the maximum values are marked as $\theta_{zx21}$ and $\theta_{zy21}$, the minimum values are marked as $\theta_{zx22}$ and $\theta_{zy22}$, and geographical azimuth angles corresponding to the maximum values, the minimum values and zero point values of the inclination angles are marked as $\varphi_{zx21}$, $\varphi_{zy21}$, $\varphi_{zx22}$, $\varphi_{zy22}$, $\varphi_{zxo21}$, $\varphi_{zxo22}$, $\varphi_{zyo21}$ and $\varphi_{zyo22}$;

respectively calculating basic parameters related to subsequent calculation, where the basic parameters includes a total magnetic field strength value T of test field, an included angle JTI2 between a central axis vertical plane of the D-shaped vertical pipe and a total magnetic field strength value T vector, and an included angle Jmx between $M_X$ magnetic axis and the central axis vertical plane of the D-shaped vertical pipe during a second measurement. Preferably, calculation formulas of the basic parameters are:

$$CS1 = \frac{T_{X11} - T_{X12}}{2}$$

$$CS2 = -\frac{T_{X11} + T_{X12}}{2}$$

$$CS3 = \frac{T_{X21} - T_{X22}}{2}$$

$$CS4 = -\frac{T_{X21} + T_{X22}}{2}$$

$$SJb2 = \sqrt{\frac{CS_4^2 \left(CS_3^2 - CS_1^2\right)}{CS_2^2 CS_3^2 - CS_1^2 CS_4^2}}$$

where SJb2 is selected as a positive value;

$$JTI2 = \sin^{-1} SJb2$$

$$Jmx = \tan^{-1} \frac{CS_4 \sqrt{1 - SJb2^2}}{CS_3 \; SJb2}$$

$$T = \frac{CS_4}{\sin Jma \; SJb2}$$

calculating an included angle Jmy between $M_y$ magnetic axis and the central axis vertical plane of the D-shaped vertical pipe, and where specific calculation steps include:

enabling:

$$CS3 = \frac{T_{Y21} - T_{Y22}}{2}, \; CS4 = -\frac{T_{Y21} + T_{Y22}}{2}$$

-continued $$Jmy = \tan^{-1}\frac{CS_4 \ \cot JT\!I2}{CS_3}$$

Preferably, a calculation formula of $\varphi_{Xm}$ is:

$$\varphi_{Xm} = \varphi_{T0} - \varphi_{mx11}$$

calculation formulas of $\theta_{Xm}$ and $\theta_{Ym}$ are:

$$\theta_{Xm} = 90° - J_{mx}$$

$$\theta_{Ym} = 90° - J_{my}$$

a calculation formula of $\varphi_{Ym}$ is:

$$\varphi_{Ym} = \cos^{-1}(-\cot\theta_{Xm}\cot\theta_{Ym}) + \varphi_{Xm}$$

calculation formulas of $\varphi_{Xz}$ and $\varphi_{Yz}$ are:

$$\varphi_{Xz} = \varphi_{zx21} - \varphi_{ZD0}$$

$$\varphi_{Yz} = \varphi_{zy21} - \varphi_{ZD0}$$

calculation formulas of $\theta_{Xz}$ and $\theta_{Yz}$ are:

$$\theta_{Xz} = 90° - \frac{\theta_{zx21} + \theta_{zx22}}{2}$$

$$\theta_{Yz} = 90° - \frac{\theta_{zy21} + \theta_{zy22}}{2}.$$

Preferably, calculating and obtaining an azimuth angle $\varphi_{ZD0}$ of the D-shaped vertical pipe includes:
calculating an included angle D between T and M, and calculating geomagnetic field component value $T_{Xm}$ measured by $X_M$ axis according to calculation result, where calculation formulas are:

$$\sin\theta_{VM} = \frac{\sin a \sin\theta_{ZD}\cos(\varphi_{ZD} - c) + \sqrt{\cos^2\theta_{ZD}(\cos^2\theta_{ZD} - \sin^2 a + \sin^2\theta_{ZD}\cos^2(\varphi_{ZD} - c))}}{\sin^2\theta_{ZD}\cos^2(\varphi_{ZD} - c) + \cos^2\theta_{ZD}}$$

$$\sin\theta_{VT} = \frac{\sin b \sin\theta_{ZD}\cos\varphi_{ZD} + \sqrt{\cos^2\theta_{ZD}(\cos^2\theta_{ZD} - \sin^2 b + \sin^2\theta_{ZD}\cos^2\varphi_{ZD})}}{\sin^2\theta_{ZD}\cos^2\varphi_{ZD} + \cos^2\theta_{ZD}}$$

$$\cos\theta_{VM} = \frac{\sin a - \sin\theta_{VM}\sin\theta_{ZD}\cos(\varphi_{ZD} - c)}{\cos\theta_{ZD}}$$

$$\cos D = T \cdot M = \sin\theta_{VT}\ \sin\theta_{VM}\cos c + \cos\theta_{VT}\cos\theta_{VM}$$

$$T_{Xm} = T\cos D = T(\sin\theta_{VT}\ \sin\theta_{VM}\cos c + \cos\theta_{VT}\cos\theta_{VM})$$

where $a = Jmx$, $b = JTI2$, $\theta_{ZD} = \theta_{ZX21} - \theta_{Xz}$;

where calculating an azimuth angle $\varphi_{ZD0}$ of $Z_M$ by using fitting calculation mode, and calculation steps include: selecting c with four values, where four values respectively correspond to azimuth angles of a maximum value, a minimum value and two zero point values of $X_M$ axis in magnetic measuring data in a second measurement, and are marked as c1, c2, c3 and c4, where, $$c1 = \varphi_{mx21} - DT0, \ c2 = \varphi_{mx22} - DT0,$$

$$c3 = \varphi_{mxo21} - DT0, \ c4 = \varphi_{mxo22} - DT0;$$

presetting $\varphi_{ZD}$, respectively calculating and obtaining $T_{Xm}$ values corresponding to c1, c2, c3 and c4 by using above formulas, where all c values in $\sin\theta_{VM}$, $\cos\theta_{VM}$ and $\cos c$ in formulas are selected with corresponding c1, c2, c3 and c4 values: $T_{Xm(n)} = T\cos D_{(n)}$, n=1, 2, 3, 4; calculating and obtaining fitting differences MD, that is, a sum of mean square deviation between a theoretical value and a measured value calculated by above formulas:

$$MD = (T_{Xm(1)} - T_{X21})^2 + (T_{Xm(2)} - T_{X22})^2 + T_{Xm(3)}^2 + T_{Xm(4)}^2$$

where in actual calculation, $\varphi_{ZD}$ is selected as 20°~60°, and step size is 0.01°, and fitting differences $MD_{(i)}$ are respectively calculated according to the step size:

$$MD_{(i)} = (T_{Xm(1,i)} - T_{X21})^2 + (T_{Xm(2,i)} - T_{X22})^2 + T_{Xm(3,i)}^2 + T_{Xm(4,i)}^2$$

where in above formula, i represents a serial number of $\varphi_{ZD}$, and ranging from 0 to 4000, and calculation formula of corresponding azimuth angle $\varphi_{ZD(i)}$ value is:

$$\varphi_{ZD(i)} = 20 + 0.01i$$

performing trend analysis on all $MD_{(i)}$, selecting i value corresponding to $MD_{(i)}$ with a smallest trend, where $\varphi_{ZD(i)}$ value corresponding to the i value is an azimuth angle $\varphi_{ZD0}$ of a central axis of the D-shaped vertical pipe.
Preferably, correcting and calculating detected parameters in S4 includes:
normalizing a magnetic total field intensity value T vector in magnetic probe three-axis coordinate system data measured by each of the magnetic probes into a unit vector t, and solving a polar angle $\theta_{Tc}$ and an azimuth angle $\varphi_{Tc}$ of the unit vector t in the spherical coordinate system of the D-shaped vertical pipe, and specific calculation steps include:

$$|T| = \sqrt{x_m^2 + y_m^2 + z_m^2}$$

$$t_{1m} = \frac{x_m}{|T|}, \ t_{2m} = \frac{y_m}{|T|}, \ t_{3m} = \frac{z_m}{|T|}$$

$$\cos\theta_{Tc} = \cos\theta_{Xm}t_{1m} + \cos\theta_{Ym}t_{2m} + \sin\theta_{Xm}\sin\theta_{Ym}\sin(\varphi_{Ym} - \varphi_{Xm})t_{3m}$$

$$\tan\varphi_{Tc} = \frac{\sin\theta_{Xm}\sin\varphi_{Xm}t_{1m} + \sin\theta_{Ym}\sin\varphi_{Ym}t_{2m} + (\cos\theta_{Xm}\sin\theta_{Ym}\cos\varphi_{Ym} - \sin\theta_{Xm}\cos\varphi_{Xm}\cos\theta_{Ym})t_{3m}}{\sin\theta_{Xm}\cos\varphi_{Xm}t_{1m} + \sin\theta_{Ym}\cos\varphi_{Ym}t_{2m} + (\sin\theta_{Xm}\sin\varphi_{Xm}\cos\theta_{Ym} - \cos\theta_{Xm}\sin\theta_{Ym}\sin\varphi_{Ym})t_{3m}}$$

7 where a polar angle $\theta_{Tc}$ and an azimuth angle $\varphi_{Tc}$ of the unit vector t in the spherical coordinate system of the D-shaped vertical pipe are known, and a polar angle $\theta_{Tz}$ and an azimuth angle $\varphi_{Tz}$ of t in the attitude instrument coordinate system are solved, specific calculation steps include:

solving an included angle $\varphi$ between the yaw axis $X_Z$ and the roll axis $Y_Z$ of the attitude instrument:

$$\cos\varphi = \sin\theta_{Xz}\sin\theta_{Yz}\cos(\varphi_{Xz} - \varphi_{Yz}) + \cos\theta_{Xz}\cos\theta_{Yz}$$

$$\sin\varphi = \sqrt{1 - \cos^2\varphi}$$

solving $\theta_{Tz}$ and $\varphi_{Tz}$, where calculation formulas are:

$$t_{z1} = \sin\theta_{Xz}\cos\varphi_{Xz}\sin\theta_{Tc}\cos\varphi_{Tc} + \sin\theta_{Xz}\sin\varphi_{Xz}\sin\theta_{Tc}\sin\varphi_{Tc} + \cos\theta_{Xz}\cos\theta_{Tc}$$

$$t_{z2} = \frac{\sin\theta_{Yz}\cos\varphi_{Yz} - \sin\theta_{Xz}\cos\varphi_{Xz}\cos\varphi}{\sin\varphi}\sin\theta_{Tc}\cos\varphi_{Tc} +$$

$$\frac{\sin\theta_{Yz}\sin\varphi_{Yz} - \sin\theta_{Xz}\sin\varphi_{Xz}\cos\varphi}{\sin\varphi}\sin\theta_{Tc}\sin\varphi_{Tc} + \frac{\cos\theta_{Yz} - \cos\theta_{Xz}\cos\varphi}{\sin\varphi}\cos\theta_{Tc}$$

$$\cos\theta_{Tz} = \frac{\sin\theta_{Xz}\sin\varphi_{Xz}\cos\theta_{Yz} - \cos\theta_{Xz}\sin\theta_{Yz}\sin\varphi_{Yz}}{\sin\varphi}\sin\theta_{Tc}\cos\varphi_{Tc} +$$

$$\frac{\cos\theta_{Xz}\sin\theta_{Yz}\cos\varphi_{Yz} - \sin\theta_{Xz}\cos\varphi_{Xz}\cos\theta_{Yz}}{\sin\varphi}\sin\theta_{Tc}\sin\varphi_{Tc} +$$

$$\frac{\sin\theta_{Xz}\sin\theta_{Yz}\sin(\varphi_{Yz} - \varphi_{Xz})}{\sin\varphi}\cos\theta_{Tc}$$

$$\tan\varphi_{Tz} = \frac{t_{z2}}{t_{z1}}$$

where polar angle $\theta_{Tz}$ and azimuth angle $\varphi_{Tz}$ of the unit vector t in the attitude instrument coordinate system are known, polar angle $\theta_{TD}$ and azimuth angle $\varphi_{TD}$ of t in the geographic coordinate system are solved, and specific calculation steps include:

$$\cos(\varphi_{XD} - \varphi_{YD}) = \frac{\cos\varphi - \cos\theta_{XD}\cos\theta_{YD}}{\sin\theta_{XD}\sin\theta_{YD}}$$

$$\sin(\varphi_{XD} - \varphi_{YD}) = \sqrt{1 - \cos^2(\varphi_{XD} - \varphi_{YD})}$$

$$t_{D1} = \sin\theta_{XD}\cos\varphi_{XD}\sin\theta_{Tz}\cos\varphi_{Tz} +$$

$$\frac{\sin\theta_{YD}\cos\varphi_{YD} - \sin\theta_{XD}\cos\varphi_{XD}\cos\varphi}{\sin\varphi}\sin\theta_{Tz}\sin\varphi_{Tz} +$$

$$\frac{\sin\theta_{XD}\sin\varphi_{XD}\cos\theta_{YD} - \cos\theta_{XD}\sin\theta_{YD}\sin\varphi_{YD}}{\sin\varphi}\cos\theta_{Tz}$$

$$t_{D2} = \sin\theta_{XD}\sin\varphi_{XD}\sin\theta_{Tz}\cos\varphi_{Tz} +$$

$$\frac{\sin\theta_{YD}\sin\varphi_{YD} - \sin\theta_{XD}\sin\varphi_{XD}\cos\varphi}{\sin\varphi}\sin\theta_{Tz}\sin\varphi_{Tz} +$$

$$\frac{\cos\theta_{XD}\sin\theta_{YD}\cos\varphi_{YD} - \sin\theta_{XD}\cos\varphi_{XD}\cos\theta_{YD}}{\sin\varphi}\cos\theta_{Tz}$$

$$\cos\theta_{TD} = \cos\theta_{XD}\sin\theta_{Tz}\cos\varphi_{Tz} + \frac{\cos\theta_{YD} - \cos\theta_{XD}\cos\varphi}{\sin\varphi}\sin\theta_{Tz}\sin\varphi_{Tz} +$$

$$\frac{\sin\theta_{XD}\sin\theta_{YD}\sin(\varphi_{YD} - \varphi_{XD})}{\sin\varphi}\cos\theta_{Tz}$$

$$\tan\varphi_{TD} = \frac{t_{D2}}{t_{D1}}$$

where in above formulas, $\varphi_{XD}$ angle is equal to a sum of $\varphi_{Xz}$ angle and an azimuth angle measured by the

8 attitude instrument, that is, $\theta_{XD}$ is a pitch angle measured by the attitude instrument, $\theta_{YD}$ is a yaw angle measured by the attitude instrument, and calculation result $\varphi_{TD}$ is a magnetic declination angle of measured magnetic vector, and $\theta_{TD}$ is a complementary angle of a magnetic vector inclination angle.

Compared with the prior art, the disclosure has the following beneficial effects.

According to the disclosure, the accuracy of geomagnetic vector measurement can be greatly improved, and the exploration effect can be improved; the integrated magnetic vector measurement equipment main body can be used as a pod device for automatically stabilizing the attitude, and is used for carrying out measurement of airborne magnetic vector and magnetic vector vertical gradient, so as to solve the problem of amplitude and azimuth measurement of magnetic vector measurement in the above background technology. And it can also be appropriately simplified, and parts such as a tail rudder, a sling and the like can be removed, so that it is used for ground geomagnetic vector measurement, and has higher practicability.

BRIEF DESCRIPTION OF DRAWINGS

FIG. 5 is a schematic diagram of the calibration method according to the disclosure.

Figure 1:
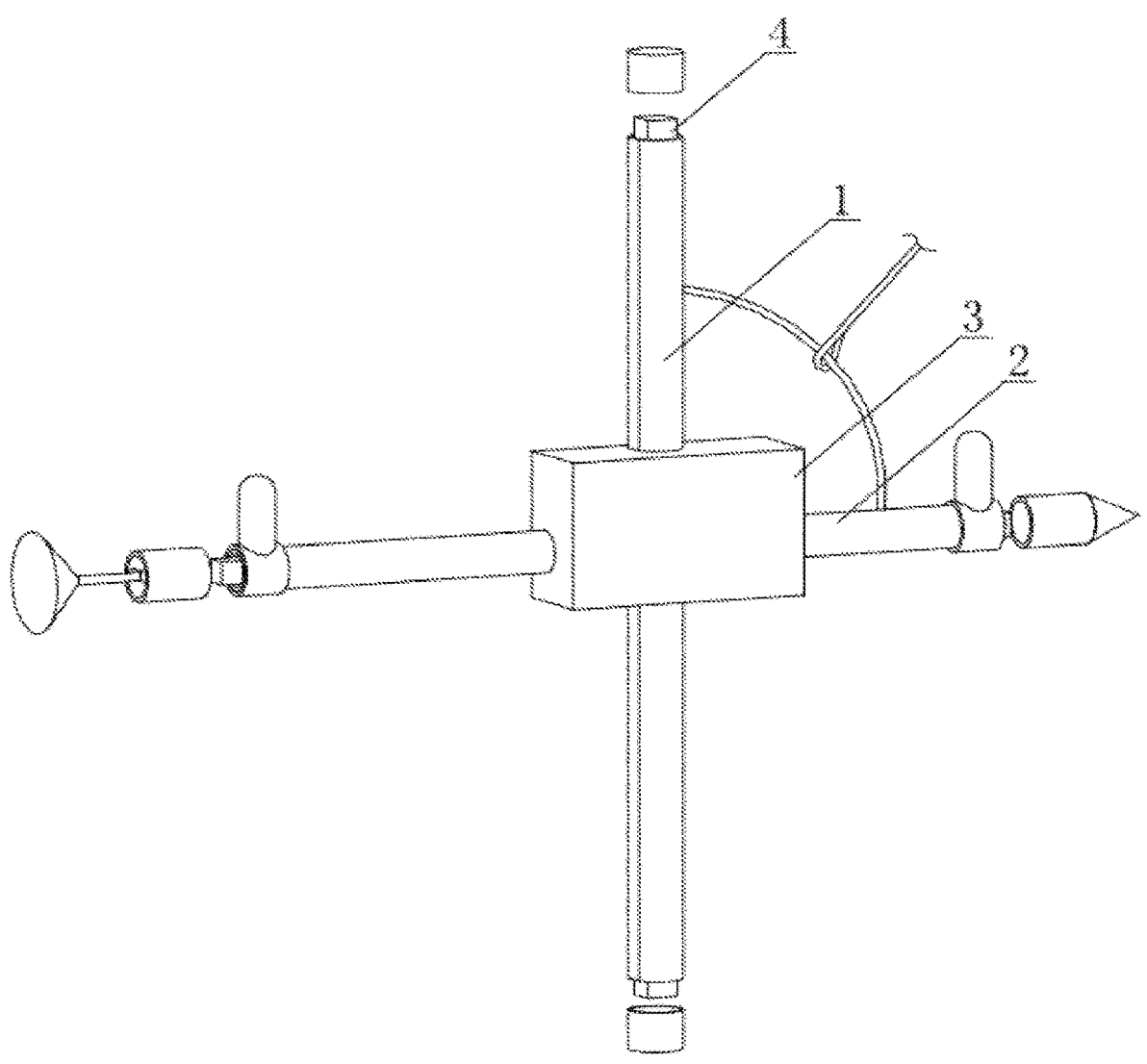
FIG. 1 is a schematic diagram of the magnetic vector measuring equipment main body according to the disclosure.

List of reference characters: 1 D-shaped vertical pipe; 2 framing horizontal pipe; 3 electromagnetic shielding cabinet; 4 magnetic probe; and 5 rotatable sleeve.

DETAILED DESCRIPTION OF THE EMBODIMENTS

In the following, the technical scheme in the embodiment of the disclosure will be clearly and completely described with reference to the attached drawings in the embodiment of the disclosure. Obviously, the described embodiment is only a part of the embodiment of the disclosure, but not all of the embodiments. Based on the embodiments in the disclosure, all other embodiments obtained by those ordinary skilled in the field without creative efforts belong to the scope of protection of the disclosure.

Figure 2:
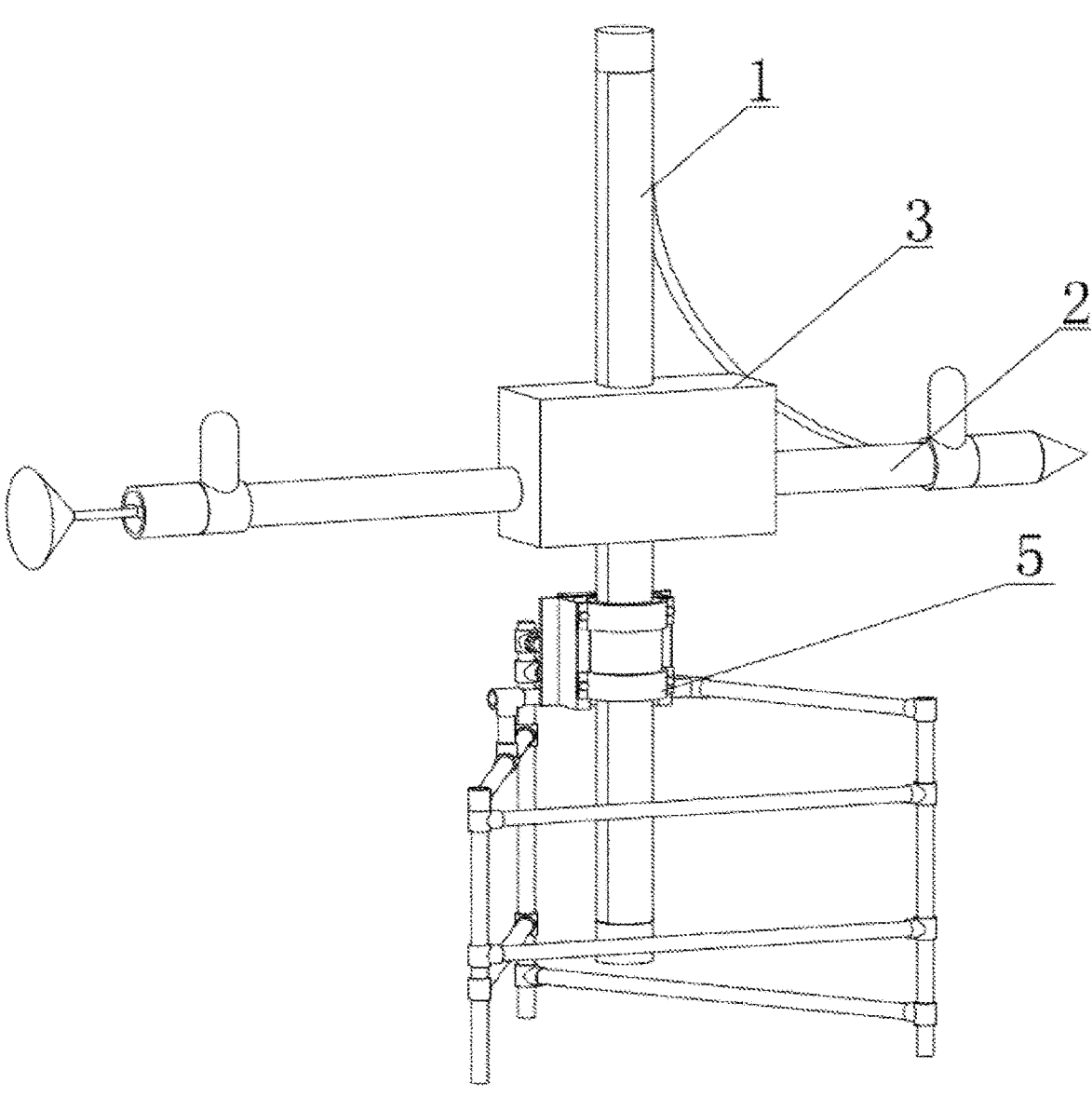
FIG. 2 is a diagram of the magnetic vector measuring equipment main body standing on a bracket according to the disclosure.
Figure 3:
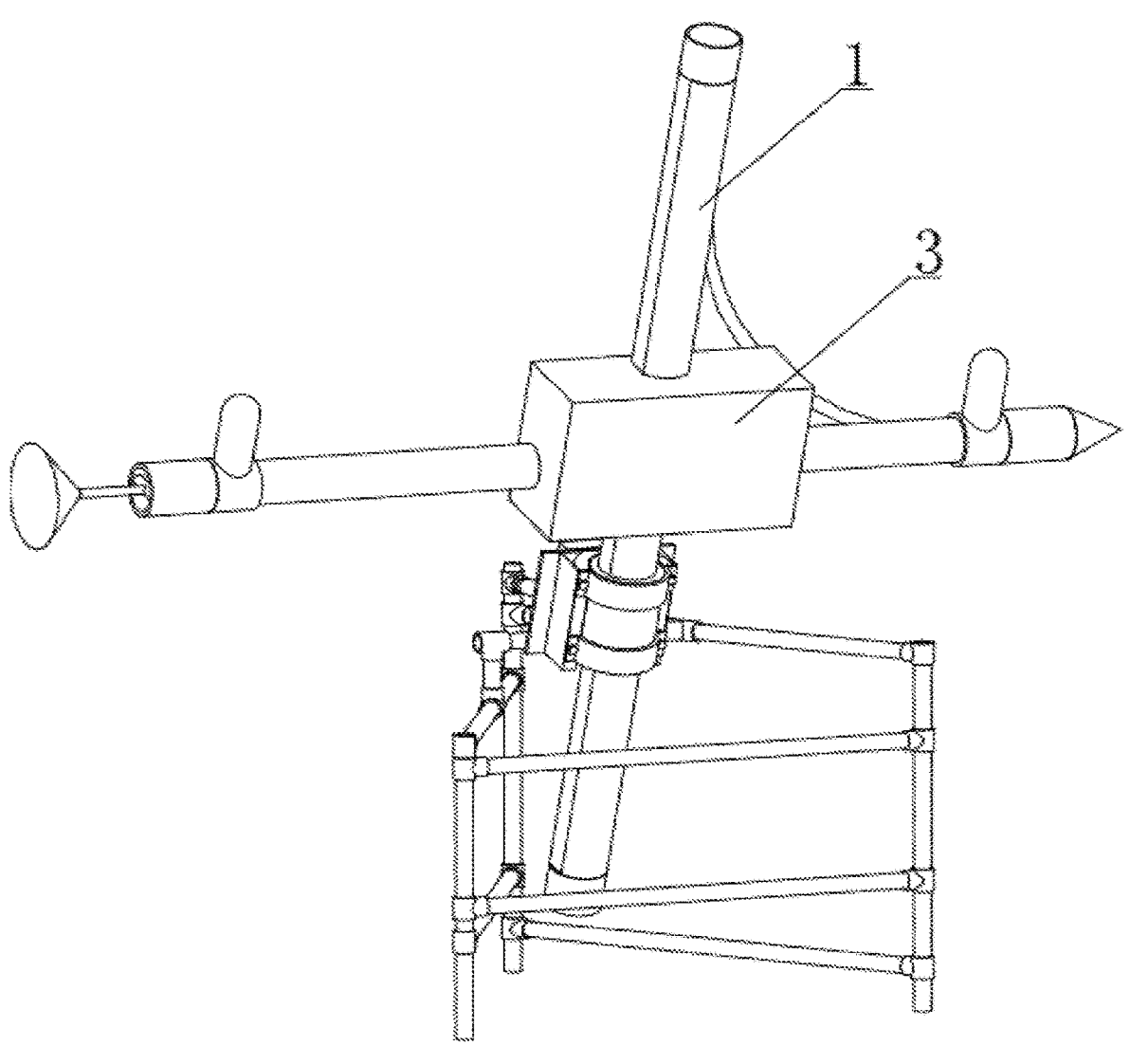
FIG. 3 is a diagram of the magnetic vector measuring equipment main body tilting on the bracket according to the disclosure.
Figure 4:
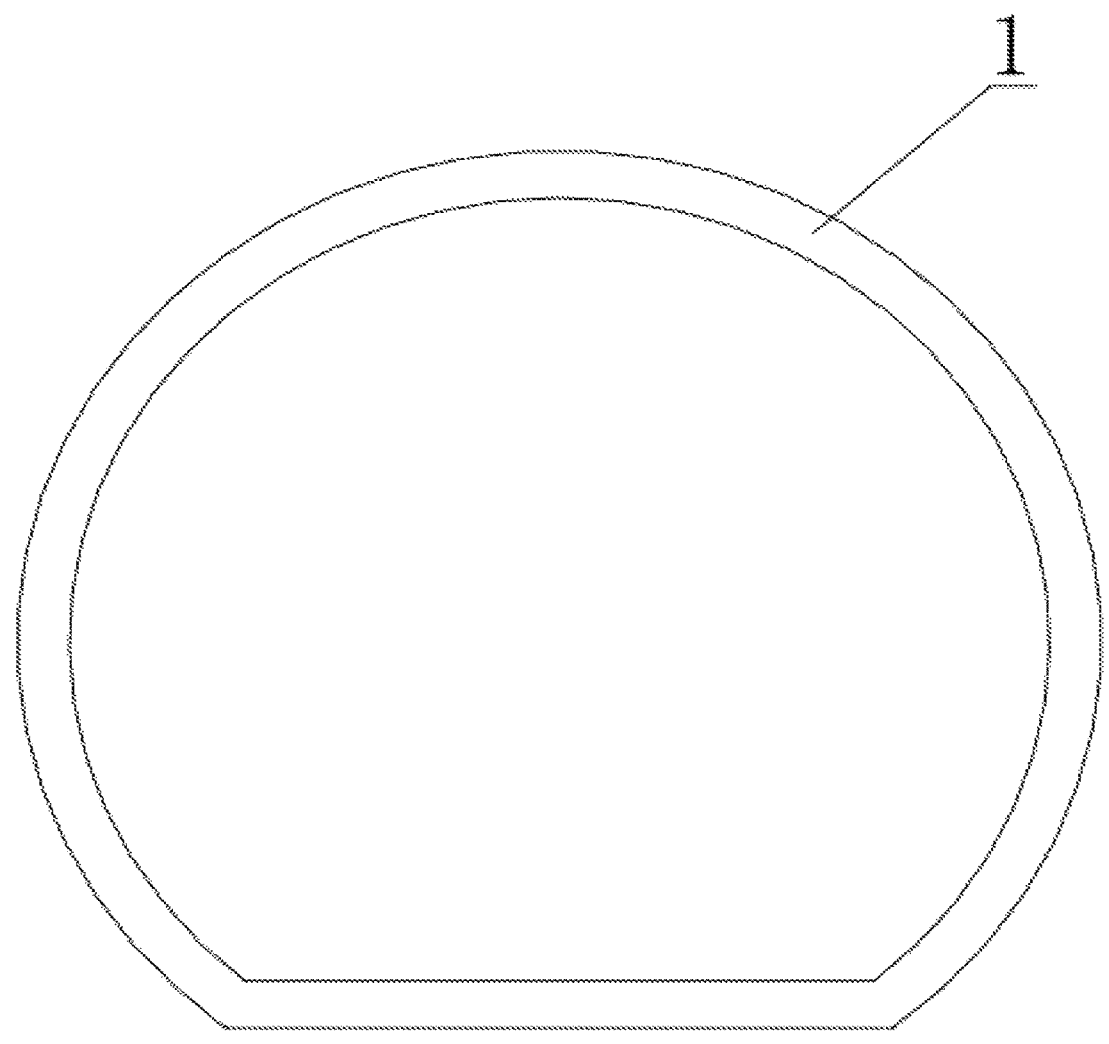
FIG. 4 is a cross-sectional diagram of the D-shaped vertical pipe according to the disclosure.

In order to solve the problem that the existing airborne magnetic vector measurement mostly adopts manned helicopters or fixed-wing aircraft, and the magnetometer and attitude instrument are rigidly installed on the aircraft through devices such as hard brackets, and there is no perfect calibration scheme, the measurement accuracy is not satisfactory, please refer to FIGS. 1-5. This embodiment provides the following technical scheme: an integration and calibration method of geomagnetic vector measurement devices for exploration, and the method includes the following steps:

S1, a magnetic vector measuring equipment main body is designed as a cross-shaped frame structure, where a rotatable sleeve 5 is arranged at a middle and lower part of a vertical pipe of the cross-shaped frame structure.

S2, magnetic probes 4 are arranged at upper and lower ends of a cross-shaped frame of integrated magnetic vector measuring equipment main body, where each of the magnetic probes 4 is sealed in the cross-shaped frame of the magnetic vector measuring equipment main body through a cap plug.

S3, a rotation relationship between three magnetic axis coordinates of each of the magnetic probes 4 and three-axis coordinates of an attitude instrument is detected, where the three magnetic axis coordinates are marked as ($X_M$, $Y_M$, $Z_M$), and the three-axis coordinates of the attitude instrument are marked as (Xz, Yz, Zz), and three axis of the attitude instrument are respectively a roll axis, a yaw axis and an azimuth axis.

S4, detected parameters are corrected and calculated, a polar angle and an azimuth angle of T in a spherical coordinate system of a D-shaped vertical pipe 1 are solved, then a polar angle and an azimuth angle of T in an attitude instrument coordinate system are solved, and finally a polar angle and an azimuth angle of T in a geographical coordinate system are solved.

The magnetic probe 4 is organically integrated with the attitude instrument host and GPS antenna, and the electromagnetic shielding cabinet 3 is used to reduce the interference of power supply, host and other instruments to the magnetic probe 4. The calibration of the magnetic vector measuring equipment main body mainly includes detection and correction calculation, that is, the spatial relationship between the three magnetic axis ($X_M$, $Y_M$, $Z_M$) of the magnetic probe 4 and the three axis ($X_Z$, $Y_Z$, $Z_Z$) of the attitude instrument is detected. The original ($X_M$, $Y_M$, $Z_M$) magnetic three-component data measured by the magnetic probe 4 are performed coordinate transformation by using the above spatial relationship. Finally, they are converted into the magnetic three-component data in the geographical coordinate system ($X_D$, $Y_D$, $Z_D$).

A method for manufacturing the magnetic vector measuring equipment main body specifically includes:

an integrated magnetic vector measuring equipment main body is designed as a cross-shaped frame structure, a stable rotatable sleeve 5 is arranged at a middle and lower part of a vertical pipe of the cross-shaped frame structure. After the rotatable sleeve 5 is fixed on the stable bracket, the whole cross-shaped frame can rotate with the D-shaped vertical pipe 1 as the rotating shaft.

The D-shaped vertical pipe 1 is taken as a foundation and a D-plane of the D-shaped vertical pipe 1 as a benchmark, the cross-shaped frame is built in a middle part of the D-shaped vertical pipe 1 by using two framing horizontal pipes 2. So that the D-shaped vertical pipe 1 is perpendicular to the cross of the two framing horizontal pipes in the middle, and the D-plane of the D-shaped vertical pipe 1 is perpendicular to the cross surface, and the two horizontal pipes in the middle are in a straight line. The arc surface of the D-shaped vertical pipe 1 faces forward to reduce the wind resistance, and the upper and lower ends of the D-plane are used to install the magnetic probes 4, which is convenient for controlling the probe posture and increasing the stability of the probe.

A hole is dug in the middle part of the D-shaped vertical pipe 1, two outer thin horizontal pipes are respectively sleeved on outer sides of two framing horizontal pipes 2 in the middle part of the D-shaped vertical pipe 1, and GPS antennas are respectively fixed at upper ends of outer sides of the two thin horizontal pipes. One end of the framing horizontal pipe 2 is provided with a directional tail rudder, and the other end is provided with a head end cap plug. The tail rudder is surrounded by a plastic thin sheet, and the plastic thin sheet is provided with a cutting line for adjusting the wind resistance.

An electromagnetic shielding cabinet 3 is fixedly installed at a position of the D-shaped vertical pipe 1 meeting the framing horizontal pipes 2 in a middle part of the cross-shaped frame, where a magnetometer host, a recording system, an attitude instrument host and a power supply are installed in the electromagnetic shielding cabinet 3. The electromagnetic shielding cabinet 3 is divided into three cuboid frames, which are made of carbon fiber plates and structural members, and are respectively fixed at the behind upper, behind lower and front lower parts of the cross point in the middle of the cross-shaped frame. So that the front and lower sides of the electromagnetic shielding cabinet 3 of the attitude instrument host are vertical, and the electromagnetic shielding cabinet 3 is a rectangular flat box-shaped fairing. The inner side of the fairing is attached with a copper wire mesh, and the outer side is attached with a pomohe gold foil. The inner copper wire mesh mainly plays an electromagnetic shielding role, and the outer pomohe gold foil mainly plays a magnetic shielding role.

The front panel of the electromagnetic shielding cabinet 3 of the attitude instrument is attached to the D-plane of the D-shaped vertical pipe 1, the front of the attitude instrument is attached to the front of the electromagnetic shielding cabinet 3, the bottom surface of the attitude instrument is fixed to the electromagnetic shielding cabinet 3. The magnetometer host, the recording system and the power supply are all fixed in the corresponding electromagnetic shielding cabinet 3. Magnetic probes 4 are installed at both ends of the D-shaped vertical pipe 1, the magnetic probes 4 are attached to the D-plane of the D-shaped vertical pipe 1, and the longitudinal central axis of the magnetic probes 4 coincides with the longitudinal central axis of the D-plane of the D-shaped vertical pipe 1. The magnetic probe 4 is in a shape of a rectangular column, and the magnetic probe 4 and the GPS cable pass through the D-shaped vertical pipe 1 and the framing horizontal pipe 2, and are connected with the host in the middle part of the magnetic vector measuring equipment main body. The rotatable sleeve is installed under the electromagnetic shielding cabinet 3, and the rotatable sleeve is closely sleeved with the D-shaped vertical pipe 1, so that the directions of the three axis of the attitude instrument and the three axis of the magnetic probe 4 are basically the same. The magnetic probe 4 is slightly disturbed, and the cable disturbance is weak. The D-shaped vertical pipe 1 is a whole carbon fiber pipe with a D-shaped cross section, and the middle part of the D-shaped vertical pipe is dug for inserting cables. The framing horizontal pipe 2 is a segmented carbon fiber pipe with a circular cross-section, and the middle of the framing horizontal pipe is dug a hole for inserting cables. The middle and lower part of the D-shaped vertical pipe 1 is provided with a rotatable sleeve 5, which is tightly sleeved with the D-shaped vertical pipe 1, and can be rotated but not loosened, so as to ensure that the vertical pipe does not shake when rotating. The rotatable sleeve 5 is tightly engaged with the clamp on the bracket to realize the overall rotation of the magnetic vector measuring equipment main body. Blocks are installed at the upper and lower ends of the sleeve on the D-shaped vertical pipe 1 to ensure that the sleeve does not fall off and has a sliding support surface when rotating.

Detecting a rotation relationship between the three magnetic axis coordinates of each of the magnetic probes 4 and coordinates of the roll axis, the yaw axis and the azimuth axis of the attitude instrument in step S3 specifically includes:

The spherical coordinate system of the D-shaped vertical pipe 1 is built, where the spherical coordinate system of the D-shaped vertical pipe 1 is marked as $(\gamma, \theta, \varphi: Z_C, X_C)$, a central axis of the D-shaped vertical pipe 1 is taken as a $Z_C$ axis, a center of the cross-shaped frame of the magnetic vector measuring equipment main body is taken as an original point, and a connecting line of two GPS antennas of the attitude instrument is taken as an $X_C$ axis.

The rotation relationships between the three-axis coordinate system $(X_M, Y_M, Z_M)$ of each of the magnetic probes 4 and the spherical coordinate system $(\gamma, \theta, \varphi: Z_C, X_C)$ of the D-shaped vertical pipe 1, and the three-axis coordinate system (Xz, Yz, Zz) of the attitude instrument and the spherical coordinate system of the D-shaped vertical pipe 1 are respectively detected. So as to indirectly connect the three-axis coordinate system of the magnetic probe 4 with the three-axis coordinate system of the attitude instrument for the purpose of detection and correction.

Two sets of data obtained from two detection are collated, 10 columns of data with a best quality are selected as detecting basic data, and data values of various feature points are respectively analyzed and obtained.

Azimuth angles and polar angles of $X_M$ axis and $Y_M$ axis in the spherical coordinate system of the D-shaped vertical pipe 1 are calculated, where a polar angle of $X_M$ axis in the spherical coordinate system of the D-shaped vertical pipe 1 is marked as $\theta_{Xm}$, a polar angle of $Y_M$ axis in the spherical coordinate system of the D-shaped vertical pipe 1 is marked as $\theta_{Ym}$, an azimuth angle of $X_M$ axis in the spherical coordinate system of the D-shaped vertical pipe 1 is marked as $\varphi_{Xm}$, and an azimuth angle of $Y_M$ axis in the spherical coordinate system of the D-shaped vertical pipe 1 is marked as $\varphi_{Ym}$.

Azimuth angles and polar angles of $X_Z$ axis and $Y_Z$ axis in the spherical coordinate system of the D-shaped vertical pipe 1 are calculated, where an azimuth angle of $X_Z$ axis in the spherical coordinate system of the D-shaped vertical pipe 1 is marked as $\varphi_{Xz}$, an azimuth angle of $Y_Z$ axis in the spherical coordinate system of the D-shaped vertical pipe 1 is marked as $\varphi_{Yz}$, a polar angle of $X_Z$ axis in the spherical coordinate system of the D-shaped vertical pipe 1 is marked as $\theta_{Xz}$, and a polar angle of $Y_Z$ axis in the spherical coordinate system of the D-shaped vertical pipe 1 is marked as $\theta_{Yz}$.

According to magnetic measuring data of second measurement, an azimuth angle of $Z_M$ axis is made as $\varphi_{ZD}$, a polar angle of $Z_M$ axis as $\theta_{ZD}$, the azimuth angle of $X_M$ axis is made as c, and a magnetic north azimuth angle as $\varphi_{T0}$, and then an azimuth angle $\varphi_{ZD0}$ of the D-shaped vertical pipe 1 is calculated and obtained.

Respectively analyzing and obtaining data values of various feature points specifically includes:

Maximum values and minimum values of magnetic field components observed by $X_M$ magnetic axis and $Y_M$ magnetic axis of each of the magnetic probes 4 in first observation data are respectively analyzed and obtained, where the maximum values are marked as $T_{x11}$ and $T_{y11}$, and the minimum values are marked as $T_{x12}$ and $T_{y12}$, and geographical azimuth angles corresponding to the maximum values, the minimum values and zero point values of magnetic field components are marked as $\varphi_{mx11}$, $\varphi_{my11}$, $\varphi_{mx12}$, $\varphi_{my12}$, $\varphi_{mxo11}$, $\varphi_{mxo12}$, $\varphi_{myo11}$ and $\varphi_{myo12}$.

Maximum values and minimum values of magnetic field components observed by $X_M$ magnetic axis and $Y_M$ magnetic axis of each of the magnetic probes 4 in second observation data are respectively analyzed and obtained, where the maximum values are marked as $T_{x21}$ and $T_{y21}$, the minimum values are marked as $T_{x22}$ and $T_{y22}$, and geographical azimuth angles corresponding to the maximum values, the minimum values and zero point values of magnetic field components are marked as $\varphi_{mx21}$, $\varphi_{my21}$, $\varphi_{mx22}$, $\varphi_{my22}$, $\varphi_{mxo21}$, $\varphi_{mxo22}$, $\varphi_{myo21}$ and $\varphi_{myo22}$.

Maximum values and minimum values of observed inclination angles of yaw axis $X_Z$ and pitch axis $Y_Z$ in first observation attitude instrument data are respectively analyzed and obtained, where the maximum values are marked as $\theta_{zx11}$ and $\theta_{zy11}$, the minimum values are marked as $\theta_{zx12}$ and $\theta_{zy12}$, and geographical azimuth angles corresponding to the maximum values, the minimum values and zero point values of the inclination angles are marked as $\varphi_{zx11}$, $\varphi_{zy11}$, $\varphi_{zx12}$, $\varphi_{zy12}$, $\varphi_{zxo11}$, $\varphi_{zxo12}$, $\varphi_{zyo11}$ and $\varphi_{zyo12}$.

Then maximum values and minimum values of inclination angles observed on yaw axis $X_Z$ and pitch axis $Y_Z$ in second observation attitude instrument data are analyzed and obtained, where the maximum values are marked as $\theta_{zx21}$ and $\theta_{zy21}$, the minimum values are marked as $\theta_{zx22}$ and $\theta_{zy22}$, and geographical azimuth angles corresponding to the maximum values, the minimum values and zero point values of the inclination angles are marked as $\varphi_{zx21}$, $\varphi_{zy21}$, $\varphi_{zx22}$, $\varphi_{zy22}$, $\varphi_{zxo21}$, $\varphi_{zxo22}$, $\varphi_{zyo21}$ and $\varphi_{zyo22}$.

Basic parameters related to subsequent calculation are respectively calculated, where the basic parameters includes a total magnetic field strength value T of test field, an included angle JTI2 between a central axis vertical plane of the D-shaped vertical pipe 1 and a total magnetic field strength value T vector, and an included angle Jmx between $M_X$ magnetic axis and the central axis vertical plane of the D-shaped vertical pipe 1 during a second measurement.

Respectively detecting the rotation relationships between the three-axis coordinate system of each of the magnetic probes 4 and the spherical coordinate system of the D-shaped vertical pipe 1, and the three-axis coordinate system of the attitude instrument and the spherical coordinate system of the D-shaped vertical pipe 1 specifically includes:

Wild secluded section with a quiet field and no human interference is selected as the test field, and the variation amplitude of geomagnetic field is small during the test.

A non-magnetic tripod and a magnetic deflectometer are used to observe and confirm the magnetic declination Dro of the test field in the field, and the geographical azimuth angle $\varphi_{T0}$ of the horizontal component of the geomagnetic field is confirm, and $\varphi_{T0} = 360° + D_{T0}$.

The supporting bracket of the mobile station is erected, the bracket is adjusted, so that the initial position of the snap ring used to buckle the D-shaped vertical pipe 1 is vertical as far as possible and the bracket is stable. The bracket is made of carbon fiber pipe and PE pipe fittings, which is non-magnetic, stable and firm, and can be increased stability by counterweight such as water pressure bag, which is foldable and convenient to carry.

The mobile station is installed on the bracket, so that the D-shaped vertical pipe 1 of the mobile station is as vertical as possible.

Startup is performed, the sampling rate of attitude instrument and magnetometer is set to not less than 200 Hz and recording automatically is performed.

The mobile station is rotated horizontally for 2-3 cycles at a constant speed, about one minute per cycle, and the data sequence corresponding to this 2-3 cycle period is recorded, including time (accurate to milliseconds), latitude and longitude, altitude, geographic azimuth angle (resolved to 0.01 degree), yaw angle (resolved to 0.01 degree), pitch angle (resolved to 0.01 degree) and ten columns with about 20,000 to 30,000 rows of data, such as the magnetic three-component xm-ym-zm (resolved to 0.01 nT).

The angle of the rotatable sleeve on the bracket is adjusted, so that the D-shaped vertical pipe 1 is inclined to the northeast by about 20 degrees and fixed, and then the mobile station is rotated horizontally for 2~3 cycles at a constant speed again to obtain 10 columns of data of about 20,000 to 30,000 rows similar to the previous step.

The obtained data for two times is checked. If the data changes regularly without sudden change, and the daily change is stable and the change amplitude is weak during this period (no more than 10 minutes), the field detection is completed.

The calculation formulas of the basic parameters are:

$$CS1 = \frac{T_{X11} - T_{X12}}{2}$$

$$CS2 = -\frac{T_{X11} + T_{X12}}{2}$$

$$CS3 = \frac{T_{X21} - T_{X22}}{2}$$

$$CS4 = -\frac{T_{X21} + T_{X22}}{2}$$

$$SJb2 = \sqrt{\frac{CS_4^2 \left(CS_3^2 - CS_1^2\right)}{CS_2^2 CS_3^2 - CS_1^2 CS_4^2}}$$

where SJb2 is selected as a positive value;

$$JTI2 = \sin^{-1} SJb2$$

$$Jmx = \tan^{-1} \frac{CS_4 \sqrt{1 - SJb2^2}}{CS_3 SJb2}$$

$$T = \frac{CS_4}{\sin Jma \; SJb2}$$

An included angle Jmy between $M_y$ magnetic axis and the central axis vertical plane of the D-shaped vertical pipe 1 is calculated, and where specific calculation steps include: enabling $$CS3 = \frac{T_{Y21} - T_{Y22}}{2}, CS4 = -\frac{T_{Y21} + T_{Y22}}{2}$$

$$Jmy = \tan^{-1} \frac{CS_4 \cot JTI2}{CS_3}.$$

a calculation formula of $\varphi_{Xm}$ is:

$$\varphi_{Xm} = \varphi_{T0} - \varphi_{mx11}$$

calculation formulas of $\theta_{Xm}$ and $\theta_{Ym}$ are:

$$\theta_{Xm} = 90° - J_{mx}$$

$$\theta_{Ym} = 90° - J_{my}$$

a calculation formula of $\varphi_{Ym}$ is:

$$\varphi_{Ym} = \cos^{-1}(-\cot \theta_{Xm} \cot \theta_{Ym}) + \varphi_{Xm}$$

calculation formulas of $\varphi_{Xz}$ and $\varphi_{Yz}$ are:

$$\varphi_{Xz} = \varphi_{zx21} - \varphi_{ZD0}$$

$$\varphi_{Yz} = \varphi_{zy21} - \varphi_{ZD0}$$

calculation formulas of $\theta_{Xz}$ and $\theta_{Yz}$ are:

$$\theta_{Xz} = 90° - \frac{\theta_{zx21} + \theta_{zx22}}{2}$$

$$\theta_{Yz} = 90° - \frac{\theta_{zy21} + \theta_{zy22}}{2}.$$

Calculating and obtaining an azimuth angle $\varphi_{ZD0}$ of the D-shaped vertical pipe 1 includes:

An included angle D between T and M is calculated, and geomagnetic field component value $T_{Xm}$ measured by $X_M$ axis is calculated according to calculation result, where calculation formulas are:

$$\sin \theta_{VM} = \frac{\sin a \sin \theta_{ZD} \cos(\varphi_{ZD} - c) + \sqrt{\cos^2 \theta_{ZD}\left(\cos^2 \theta_{ZD} - \sin^2 a + \sin^2 \theta_{ZD} \cos^2(\varphi_{ZD} - c)\right)}}{\sin^2 \theta_{ZD} \cos^2(\varphi_{ZD} - c) + \cos^2 \theta_{ZD}}$$

$$\sin \theta_{VT} = \frac{\sin b \sin \theta_{ZD} \cos \varphi_{ZD} + \sqrt{\cos^2 \theta_{ZD}\left(\cos^2 \theta_{ZD} - \sin^2 b + \sin^2 \theta_{ZD} \cos^2 \varphi_{ZD}\right)}}{\sin^2 \theta_{ZD} \cos^2 \varphi_{ZD} + \cos^2 \theta_{ZD}}$$

$$\cos \theta_{VM} = \frac{\sin a - \sin \theta_{VM} \sin \theta_{ZD} \cos(\varphi_{ZD} - c)}{\cos \theta_{ZD}}$$

$$\cos D = T \cdot M = \sin \theta_{VT} \sin \theta_{VM} \cos c + \cos \theta_{VT} \cos \theta_{VM}$$

$$T_{Xm} = T \cos D = T(\sin \theta_{VT} \sin \theta_{VM} \cos c + \cos \theta_{VT} \cos \theta_{VM})$$

where $a = Jmx$, $b = JTI2$, $\theta_{ZD} = \theta_{ZX21} - \theta_{Xz}$;

where an azimuth angle $\varphi_{ZD0}$ of $Z_M$ is calculated by using fitting calculation mode, and calculation steps include:

c with four values is selected, where four values respectively correspond to azimuth angles of a maximum value, a minimum value and two zero point values of $X_M$ axis in magnetic measuring data in a second measurement, and are marked as c1, c2, c3 and c4, where, c1=$\varphi_{mx21}$−DT0, c2=$\varphi_{mx22}$−DT0, c3=$\varphi_{mxo21}$−DT0, c4=$\varphi_{mxo22}$−DT0;

$\varphi_{ZD}$ is presetted, $T_{Xm}$ values corresponding to c1, c2, c3 and c4 are respectively calculated and obtained by using above formulas, where all c values in $\sin \theta_{VM}$, $\cos \theta_{VM}$ and $\cos$ c in formulas are selected with corresponding c1, c2, c3 and c4 values: $T_{Xm(n)}$=TcosD$_{(n)}$, n=1, 2, 3, 4;

Fitting differences MD are calculated and obtained, that is, a sum of mean square deviation between a theoretical value and a measured value calculated by above formulas:

$$MD = (T_{Xm(1)} - T_{X21})^2 + (T_{Xm(2)} - T_{X22})^2 + {T_{Xm(3)}}^2 + {T_{Xm(4)}}^2$$

where in actual calculation, $\varphi_{ZD}$ is selected as $20°{\sim}60°$, and step size is $0.01°$, and fitting differences $MD_{(i)}$ are respectively calculated according to the step size:

$$MD_{(i)} = (T_{Xm(1,i)} - T_{X21})^2 + (T_{Xm(2,i)} - T_{X22})^2 + {T_{Xm(3,i)}}^2 + {T_{Xm(4,i)}}^2$$

where in above formula, i represents a serial number of $\varphi_{ZD}$, and ranging from 0 to 4000, and calculation formula of corresponding azimuth angle $\varphi_{ZD(i)}$ value is:

$$\varphi_{ZD(i)} = 20 + 0.01i$$

The trend analysis is performed on all $MD_{(i)}$, i value corresponding to $MD_{(i)}$ with a smallest trend is selected, where $\varphi_{ZD(i)}$ value corresponding to the i value is an azimuth angle $\varphi_{ZD0}$ of a central axis of the D-shaped vertical pipe 1.

Correcting and calculating detected parameters in S4 includes:

A magnetic total field intensity value T vector in magnetic probe 4 three-axis coordinate system $(X_M, Y_M, Z_M)$ data measured by each of the magnetic probes 4 is normalized into a unit vector t, and a polar angle $\theta_{Tc}$ and an azimuth angle $\varphi_{Tc}$ of the unit vector t in the spherical coordinate system $(\gamma, \theta, \varphi: Z_C, X_C)$ of the D-shaped vertical pipe 1 are solved, and specific calculation steps include:

$$|T| = \sqrt{x_m^2 + y_m^2 + z_m^2}$$

$$t_{1m} = \frac{x_m}{|T|}, \quad t_{2m} = \frac{y_m}{|T|}, \quad t_{3m} = \frac{z_m}{|T|}$$

$$\cos\theta_{Tc} = \cos\theta_{Xm}t_{1m} + \cos\theta_{Ym}t_{2m} + \sin\theta_{Xm}\sin\theta_{Ym}\sin(\varphi_{Ym} - \varphi_{Xm})t_{3m}$$

$$\tan\varphi_{Tc} = \frac{\sin\theta_{Xm}\sin\varphi_{Xm}t_{1m} + \sin\theta_{Ym}\sin\varphi_{Ym}t_{2m} + (\cos\theta_{Xm}\sin\theta_{Ym}\cos\varphi_{Ym} - \sin\theta_{Xm}\cos\varphi_{Xm}\cos\theta_{Ym})t_{3m}}{\sin\theta_{Xm}\cos\varphi_{Xm}t_{1m} + \sin\theta_{Ym}\cos\varphi_{Ym}t_{2m} + (\sin\theta_{Xm}\sin\varphi_{Xm}\cos\theta_{Ym} - \cos\theta_{Xm}\sin\theta_{Ym}\sin\varphi_{Ym})t_{3m}}$$

where a polar angle $\theta_{Tc}$ and an azimuth angle $\varphi_{Tc}$ of the unit vector t in the spherical coordinate system $(\gamma, \theta, \varphi: Z_C, X_C)$ of the D-shaped vertical pipe 1 are known, and a polar angle $\theta_{Tz}$ and an azimuth angle $\varphi_{Tz}$ of t in the attitude instrument coordinate system $(\gamma, \theta, \varphi: X_Z, Y_Z, Z_Z)$ are solved, specific calculation steps include:

An included angle $\varphi$ between the yaw axis $X_Z$ and the roll axis $Y_Z$ of the attitude instrument are solved;

$$\cos\varphi = \sin\theta_{Xz}\sin\theta_{Yz}\cos(\varphi_{Xz} - \varphi_{Yz}) + \cos\theta_{Xz}\cos\theta_{Yz}$$

$$\sin\varphi = \sqrt{1 - \cos^2\varphi}$$

$\theta_{Tz}$ and $\varphi_{Tz}$ are solved, where calculation formulas are:

$$t_{z1} = \sin\theta_{Xz}\cos\varphi_{Xz}\sin\theta_{Tc}\cos\varphi_{Tc} + \sin\theta_{Xz}\sin\varphi_{Xz}\sin\theta_{Tc}\sin\varphi_{Tc} + \cos\theta_{Xz}\cos\theta_{Tc}$$

$$t_{z2} = \frac{\sin\theta_{Yz}\cos\varphi_{Yz} - \sin\theta_{Xz}\cos\varphi_{Xz}\cos\varphi}{\sin\varphi}\sin\theta_{Tc}\cos\varphi_{Tc} +$$
$$\frac{\sin\theta_{Yz}\sin\varphi_{Yz} - \sin\theta_{Xz}\sin\varphi_{Xz}\cos\varphi}{\sin\varphi}\sin\theta_{Tc}\sin\varphi_{Tc} + \frac{\cos\theta_{Yz} - \cos\theta_{Xz}\cos\varphi}{\sin\varphi}\cos\theta_{Tc}$$

$$\cos\theta_{Tz} = \frac{\sin\theta_{Xz}\sin\varphi_{Xz}\cos\theta_{Yz} - \cos\theta_{Xz}\sin\theta_{Yz}\sin\varphi_{Yz}}{\sin\varphi}\sin\theta_{Tc}\cos\varphi_{Tc} +$$
$$\frac{\cos\theta_{Xz}\sin\theta_{Yz}\cos\varphi_{Yz} - \sin\theta_{Xz}\cos\varphi_{Xz}\cos\theta_{Yz}}{\sin\varphi}\sin\theta_{Tc}\sin\varphi_{Tc} +$$
$$\frac{\sin\theta_{Xz}\sin\theta_{Yz}\sin(\varphi_{Yz} - \varphi_{Xz})}{\sin\varphi}\cos\theta_{Tc}$$

$$\tan\varphi_{Tz} = \frac{t_{z2}}{t_{z1}}$$

where polar angle $\theta_{Tz}$ and azimuth angle $\varphi_{Tz}$ of the unit vector t in the attitude instrument coordinate system $(Xz, Yz, Zz)$ are known, polar angle $\theta_{TD}$ and azimuth angle $\varphi_{TD}$ of t in the geographic coordinate system $(X_D, Y_D, Z_D)$ are solved. The $X_D$ axis of the geographical coordinate system points to the geographical north, $Y_D$ axis points to the geographical east, $Z_D$ axis points downward, and the original point is the same as that of Xz, Yz and Zz, and specific calculation steps include:

$$\cos(\varphi_{XD} - \varphi_{YD}) = \frac{\cos\varphi - \cos\theta_{XD}\cos\theta_{YD}}{\sin\theta_{XD}\sin\theta_{YD}}$$

$$\sin(\varphi_{XD} - \varphi_{YD}) = \sqrt{1 - \cos^2(\varphi_{XD} - \varphi_{YD})} \text{ (Positive value is selected)}$$

$$t_{D1} = \sin\theta_{XD}\cos\varphi_{XD}\sin\theta_{Tz}\cos\varphi_{Tz} +$$
$$\frac{\sin\theta_{YD}\cos\varphi_{YD} - \sin\theta_{XD}\cos\varphi_{XD}\cos\varphi}{\sin\varphi}\sin\theta_{Tz}\sin\varphi_{Tz} +$$
$$\frac{\sin\theta_{XD}\sin\varphi_{XD}\cos\theta_{YD} - \cos\theta_{XD}\sin\theta_{YD}\sin\varphi_{YD}}{\sin\varphi}\cos\theta_{Tz}$$

$$t_{D2} = \sin\theta_{XD}\sin\varphi_{XD}\sin\theta_{Tz}\cos\varphi_{Tz} +$$
$$\frac{\sin\theta_{YD}\sin\varphi_{YD} - \sin\theta_{XD}\sin\varphi_{XD}\cos\varphi}{\sin\varphi}\sin\theta_{Tz}\sin\varphi_{Tz} +$$
$$\frac{\cos\theta_{XD}\sin\theta_{YD}\cos\varphi_{YD} - \sin\theta_{XD}\cos\varphi_{XD}\cos\theta_{YD}}{\sin\varphi}\cos\theta_{Tz}$$

$$\cos\theta_{TD} = \cos\theta_{XD}\sin\theta_{Tz}\cos\varphi_{Tz} +$$
$$\frac{\cos\theta_{YD} - \cos\theta_{XD}\cos\varphi}{\sin\varphi}\sin\theta_{Tz}\sin\varphi_{Tz} + \frac{\sin\theta_{XD}\sin\theta_{YD}\sin(\varphi_{YD} - \varphi_{XD})}{\sin\varphi}\cos\theta_{Tz}$$

$$\tan\varphi_{TD} = \frac{t_{D2}}{t_{D1}}.$$

where in above formulas, $\varphi_{XD}$ angle is equal to a sum of $\varphi_{Xz}$ angle (the included angle between the yaw axis and the connecting line of two GPS antennas is positive to the east) and an azimuth angle measured by the attitude instrument, that is, $\theta_{XD}$ is a pitch angle measured by the attitude instrument, $\theta_{YD}$ is a yaw angle measured by the attitude instrument, and calculation result $\varphi_{TD}$ is a magnetic declination angle of measured magnetic vector, and $\theta_{TD}$ is a complementary angle of a magnetic vector inclination angle.

Through the above calculation, the magneticdeclination angle and magnetic inclination angle of the geomagnetic total field measured at each measuring point can be obtained. The geomagnetic total field T can be directly obtained from the original three-component data. Therefore, the purpose of accurately measuring the geomagnetic field vector can be achieved.

When airborne magnetic vector measurement is needed, the integrated magnetic vector measurement equipment main body is hung under the unmanned aerial vehicle (UAV) to realize airborne magnetic vector measurement. In order to keep the posture of integrated magnetic vector measurement equipment main body stable during flight, the gravity center of integrated magnetic vector measurement equipment main body is arranged behind and below the intersection, and the hanging cable is a hanging point that can slide. A conical tail fin is installed at the tail of the framing horizontal tube 2, and the hanging point moves with the change of wind resistance during flight, so as to ensure the dynamic balance of the integrated magnetic vector measuring equipment main body and achieve the goal of stabilizing posture. When it is necessary to carry out magnetic vector measurement on the ground, carbon fiber pipes are installed together through PE pipe fittings to form a bracket, and the bracket is provided with a snap ring that can snap the rotatable sleeve 5. After the bracket is firmly installed, the magnetic vector measurement equipment main body can be snapped on the snap ring of the bracket through the rotatable sleeve 5, that is, measurement can be carried out. The magnetic vector measurement equipment main body can be rotated stably with the D-shaped vertical pipe 1 as the axis manually, and the snap ring for snapping the rotatable sleeve 5 on the bracket can adjust the inclination angle in a fixed orientation, so that the magnetic vector measuring equipment main body can rotates horizontally steadily or tilts and then rotates with the D-shaped vertical pipe 1 as the axis.

The invention additionally encompasses a geomagnetic vector measuring device for exploration, comprising:

a main body comprising a cross-shaped frame structure, wherein a rotatable sleeve is arranged at a middle and lower part of a D-shaped vertical pipe of the cross-shaped frame structure;

wherein magnetic probes are positioned at upper and lower ends of the cross-shaped frame structure, wherein each of the magnetic probes is sealed in the cross-shaped frame structure through a cap plug;

wherein the D-shaped vertical pipe functions as a foundation wherein a D-plane of the D-shaped vertical pipe serves as a benchmark, and a cross-shaped frame in a middle part of the D-shaped vertical pipe is formed by using two framing horizontal pipes;

wherein a hole in the middle part of the D-shaped vertical pipe is formed by respectively sleeving two outer thin horizontal pipes on outer sides of two framing horizontal pipes in the middle part of the D-shaped vertical pipe, and respectively fixing GPS antennas at upper ends of outer sides of the two thin horizontal pipes; and wherein the magnetic vector measuring equipment further comprises an electromagnetic shielding cabinet at a position of the D-shaped vertical pipe meeting the framing horizontal pipes in a middle part of the cross-shaped frame, wherein a magnetometer host, a recording system, an attitude instrument host and a power supply are installed in the electromagnetic shielding cabinet;

wherein the device is capable of detecting a rotation relationship between three magnetic axis coordinates of each of the magnetic probes and three-axis coordinates of an attitude instrument, wherein the three magnetic axis coordinates are marked as $(X_M, Y_M, Z_M)$, and the three-axis coordinates of the attitude instrument are marked as (Xz, Yz, Zz), and three axis of the attitude instrument are respectively a roll axis, a yaw axis and an azimuth axis;

wherein the detected parameters can be corrected and calculated by solving a polar angle and an azimuth angle of T in a spherical coordinate system of the D-shaped vertical pipe, then solving a polar angle and an azimuth angle of T in an attitude instrument coordinate system, and finally solving a polar angle and an azimuth angle of T in a geographical coordinate system.

It should be noted that in the disclosure, relational terms such as first and second are only used to distinguish one entity or operation from another entity or operation, and do not necessarily require or imply that there is any such actual relationship or order between these entities or operations. Moreover, the term including, including or any other variation thereof is intended to cover non-exclusive inclusion, so that a process, method, article or equipment including a series of elements includes not only those elements, but also other elements not explicitly listed or include elements inherent to such process, method, article or equipment.

Although embodiments of the disclosure have been shown and described, it will be understood by those skilled in the art that various changes, modifications, substitutions and variations can be made to these embodiments without departing from the principles and spirit of the disclosure.

What is claimed is:

1. A geomagnetic vector measuring device for exploration, comprising:

a magnetic vector measuring equipment main body comprising a cross-shaped frame structure, wherein a rotatable sleeve is arranged at a middle and lower part of a D-shaped vertical pipe of the cross-shaped frame structure;

magnetic probes at upper and lower ends of the cross-shaped frame structure, wherein each of the magnetic probes is sealed in the cross-shaped frame through a cap plug;

wherein a rotation relationship can be detected between three magnetic axis coordinates of each of the magnetic probes and three-axis coordinates of an attitude instrument, wherein the three magnetic axis coordinates are marked as $(X_M, Y_M, Z_M)$, and the three-axis coordinates of the attitude instrument are marked as (Xz, Yz, Zz), and three axis of the attitude instrument are respectively a roll axis, a yaw axis and an azimuth axis;

wherein the device is configured for correcting and calculating detected parameters, solving a polar angle and an azimuth angle of total magnetic field strength T in a spherical coordinate system of the D-shaped vertical pipe, then solving a polar angle and an azimuth angle of T in an attitude instrument coordinate system, and finally solving a polar angle and an azimuth angle of T in a geographical coordinate system;

wherein the magnetic vector measuring equipment main body is configured such that:

a D-plane of the D-shaped vertical pipe functions as a benchmark, and is configured to allow assembly of the cross-shaped frame in a middle part of the D-shaped vertical pipe by using two framing horizontal pipes;

wherein a hole in a middle part of the D-shaped vertical pipe is configured to allow respectively sleeving two outer thin horizontal pipes on outer sides of the two framing horizontal pipes in the middle part of the D-shaped vertical pipe, and respectively fixing GPS antennas at upper ends of outer sides of the two thin horizontal pipes;

and wherein an electromagnetic shielding cabinet can be fixedly installed at a position of the D-shaped vertical pipe meeting the framing horizontal pipes in a middle part of the cross-shaped frame, and wherein a magnetometer host, a recording system, an attitude instrument host and a power supply are installed in the electromagnetic shielding cabinet.

\* \* \* \* \*